United States Patent
Talbert

(10) Patent No.: US 8,931,023 B2
(45) Date of Patent: Jan. 6, 2015

(54) METHOD AND SYSTEM FOR PROVIDING FEEDBACK BASED ON MONITORING OF CHANNELS AT A CUSTOMER PREMISE

(75) Inventor: Mike Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/476,110

(22) Filed: May 21, 2012

(65) Prior Publication Data

US 2013/0312020 A1    Nov. 21, 2013

(51) Int. Cl.
*H04H 60/32*    (2008.01)
*H04N 17/00*    (2006.01)
*H04N 21/4425*    (2011.01)

(52) U.S. Cl.
CPC ......... *H04N 21/4425* (2013.01); *H04N 17/002* (2013.01)
USPC ............................................. 725/107; 725/14

(58) Field of Classification Search
CPC ........................ H04N 21/4425; H04N 17/002
USPC .................................................... 725/14, 107
See application file for complete search history.

(56) References Cited

U.S. PATENT DOCUMENTS

| | | | | |
|---|---|---|---|---|
| 5,576,755 A * | 11/1996 | Davis et al. | | 725/48 |
| 5,666,645 A * | 9/1997 | Thomas et al. | | 725/47 |
| 6,895,595 B2 * | 5/2005 | Goodman et al. | | 725/136 |
| 7,076,733 B2 * | 7/2006 | Smith | | 715/716 |
| 7,706,291 B2 * | 4/2010 | Luft et al. | | 370/246 |
| 7,844,861 B2 * | 11/2010 | Hegarty et al. | | 714/46 |
| 8,081,609 B2 * | 12/2011 | Balachandran et al. | | 370/338 |
| 8,095,680 B2 * | 1/2012 | Pettersson et al. | | 709/231 |
| 8,209,729 B2 * | 6/2012 | Phillips et al. | | 725/87 |
| 2002/0120925 A1 * | 8/2002 | Logan | | 725/9 |
| 2002/0162118 A1 * | 10/2002 | Levy et al. | | 725/110 |
| 2003/0126227 A1 * | 7/2003 | Zimmerman et al. | | 709/217 |
| 2003/0208760 A1 * | 11/2003 | Sugai et al. | | 725/50 |
| 2005/0005308 A1 * | 1/2005 | Logan et al. | | 725/135 |
| 2005/0012859 A1 * | 1/2005 | Adolph et al. | | 348/473 |
| 2005/0177848 A1 * | 8/2005 | Hyun | | 725/44 |
| 2006/0085830 A1 * | 4/2006 | Bruck et al. | | 725/105 |
| 2006/0174270 A1 * | 8/2006 | Westberg et al. | | 725/39 |
| 2007/0261088 A1 * | 11/2007 | Phillips et al. | | 725/97 |
| 2008/0005505 A1 * | 1/2008 | Maegawa | | 711/156 |
| 2008/0104454 A1 * | 5/2008 | White | | 714/48 |
| 2008/0126880 A1 * | 5/2008 | Hegarty et al. | | 714/46 |
| 2008/0141305 A1 * | 6/2008 | Zhao | | 725/40 |
| 2008/0209328 A1 * | 8/2008 | Parkinson | | 715/733 |
| 2009/0013355 A1 * | 1/2009 | Han | | 725/58 |
| 2009/0034426 A1 * | 2/2009 | Luft et al. | | 370/252 |
| 2009/0077095 A1 * | 3/2009 | Imai et al. | | 707/10 |
| 2009/0089852 A1 * | 4/2009 | Randolph et al. | | 725/131 |
| 2009/0164655 A1 * | 6/2009 | Pettersson et al. | | 709/231 |
| 2009/0228573 A1 * | 9/2009 | Asakawa et al. | | 709/218 |
| 2010/0027412 A1 * | 2/2010 | Yang et al. | | 370/216 |
| 2010/0169369 A1 * | 7/2010 | Wang et al. | | 707/770 |

(Continued)

*Primary Examiner* — Nasser Goodarzi
*Assistant Examiner* — Michael B Pierorazio

(57) ABSTRACT

An approach for providing feedback based on monitoring of channels at a customer premise is described. A digital signal representing a plurality of channels transported over a media broadcast network is received at a set-top box apparatus. A determination of whether one of the plurality of channels satisfies a predetermined criterion relating to performance of the media broadcast network is performed. A network feedback signal based on the determination is generated, at the set-top box apparatus, for transmission to a network monitoring node of the media broadcast network.

20 Claims, 11 Drawing Sheets

(56) References Cited

U.S. PATENT DOCUMENTS

| | | | |
|---|---|---|---|
| 2010/0169926 A1* | 7/2010 | Westberg et al. | 725/40 |
| 2010/0186043 A1* | 7/2010 | Yuki et al. | 725/50 |
| 2011/0030022 A1* | 2/2011 | Todd et al. | 725/109 |
| 2011/0078733 A1* | 3/2011 | Lee | 725/39 |
| 2012/0016675 A1* | 1/2012 | Hopkins et al. | 704/260 |
| 2012/0054785 A1* | 3/2012 | Yang et al. | 725/16 |
| 2012/0144415 A1* | 6/2012 | Velusamy et al. | 725/14 |
| 2012/0159561 A1* | 6/2012 | Todd et al. | 725/109 |
| 2012/0185906 A1* | 7/2012 | Doets et al. | 725/109 |
| 2012/0192216 A1* | 7/2012 | Chen et al. | 725/14 |
| 2013/0114899 A1* | 5/2013 | Ambwani et al. | 382/176 |
| 2013/0160070 A1* | 6/2013 | Ladd et al. | 725/129 |

\* cited by examiner

METHOD AND SYSTEM FOR PROVIDING FEEDBACK BASED ON MONITORING OF CHANNELS AT A CUSTOMER PREMISE

BACKGROUND INFORMATION

Service providers are continually challenged to deliver value and convenience to consumers by providing compelling network services and advancing the underlying technologies. One area of interest has been the development of services and technologies relating to the delivery and monitoring of media, e.g., video content. For example, service providers may designate a network probe to monitor a particular channel at a network distribution point to ensure the quality of the particular channel at that network distribution point. However, traditional implementations of network probes for each network distribution point are cost prohibitive. Nonetheless, providing network probes at network distribution points does not provide detection of media quality issues that occur at the customer premise. Consequently, service providers typically rely on their customers to notify them about media quality issues at the customer premise; such reliance negatively impacts the customers' service experience.

Therefore, there is a need for an effective approach for monitoring for service quality at the customer premise.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing feedback based on monitoring of channels at a customer premise are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
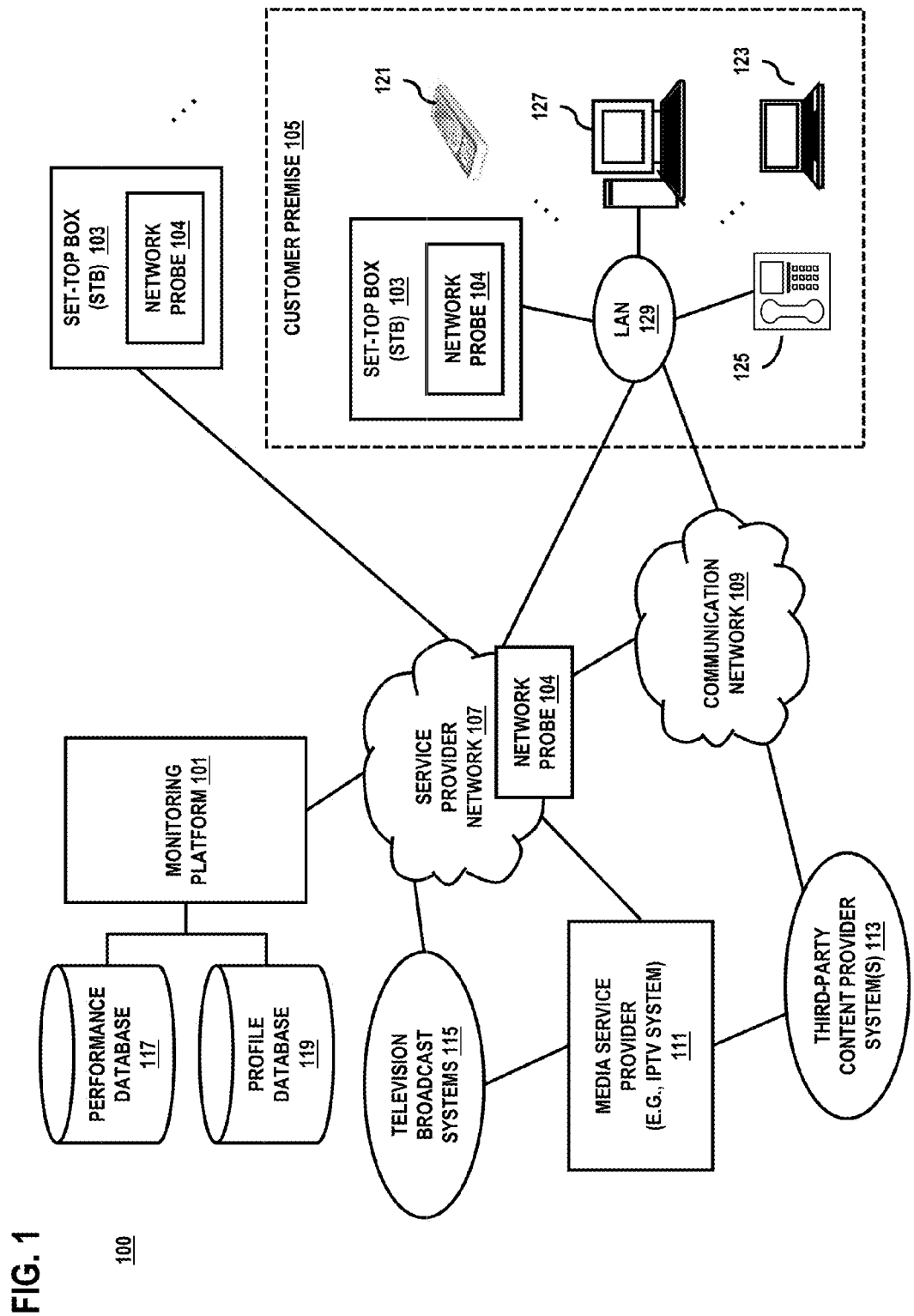
FIG. 1 is a diagram of a system capable of providing feedback based on monitoring of channels at a customer premise, according to an embodiment.

FIG. 1 is a diagram of a system capable of providing feedback based on monitoring of channels at a customer premise, according to an embodiment. For the purpose of illustration, system 100 is described with respect to a monitoring platform 101 (also referred to as a network monitoring node) that is configured to interface with one or more set-top boxes (STBs) 103 (e.g., having network probes 104) and/or other devices of a customer premise 105 associated with a user (e.g., a viewer) through a service provider network 107 and/or communication network 109. Set-top box 103 may include, for example, a device that connects to a television, media player, etc., and an external source of signal (e.g., media service provider 111), turning the signal into content which is then displayed on the television screen or other display device. Set-top boxes 103 process signals for presenting audio-visual content (e.g., broadcast television programs, Video On Demand (VOD) programs, pay-per-view programs, Internet Protocol television (IPTV) feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, media service provider (MSP) 111 may provide (in addition to their own media) content obtained from sources, such as one or more third-party content provider systems 113, one or more television broadcast systems 115, etc., as well as content available via one or more communication networks 109, etc.

In certain embodiments, the monitoring platform 101 may include or have access to a performance database 117 and a profile database 119. For example, the monitoring platform 101 may access or store predetermined criteria relating to performance of a media broadcast network, performance logs based on monitoring of channels at customer premises, etc., at the performance database 117. In addition, the monitoring platform 101 may access or store account information, history information, etc., at the profile database 119.

In some embodiments, the monitoring platform 101 is configured, as part of a network monitoring node, to detect network feedback signals by one or more devices within the customer premise 105. Hence, in certain embodiments, the monitoring platform 101 may interface with and detect the network feedback signals generated by a set-top box 103, a mobile (e.g., cellular) phone 121, a laptop computer 123, a telephone 125 and a desktop computing device 127. By way of example, the STB 103 may be integrated with the telephone 125 for supporting teleconferencing, web-based communication (e.g., Voice over IP) and the like. Respective devices of the customer premise 105 may also be configured to receive broadcast, media and content signals for rendering content to a display. By way of example, cell phone 121 may be configured to receive television content on a live or streaming basis from over a communication network 109. As such, the cell phone 121 may be used to both initiate a call and receive content for viewing.

Communication network 109 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G or 4G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 103 to various sources of media content, such as one or more third-party content provider systems 113. Although depicted in FIG. 1 as separate networks, communication network 109 may be completely or partially contained within service provider network 107. For example, service provider network 107 may include facilities to provide for transport of packet-based communications.

According to certain embodiments, devices of the customer premise 105 may also be configured to communicate over one or more local area networks (LANs) 129 corresponding to the user (e.g., viewer). In this manner, routers (not shown) may be used for establishing and operating, or at least connecting to, a network such as a "home" network or LAN 129, and is used to route communications among various interconnected devices of the customer premise 105. For example, set-top box 103 may be communicatively coupled to LAN 129 via a router and a coaxial cable, whereas devices 121, 123 and 127 may be connected to LAN 129 via a router and a wireless connection, a network cable (e.g., Ethernet cable), and/or the like. It is noted, however, that in certain embodiments set-top box 103 may be configured to establish connectivity with LAN 129 via one or more wireless connections. Further, set-top box 103, wireless devices 121 and 123, phone 125 and computing device 127 may be uniquely identified by LAN 129 via any suitable addressing scheme. For example, LAN 129 may utilize the dynamic host configuration protocol (DHCP) to dynamically assign "private" DHCP internet protocol (IP) addresses to devices of the customer premise 105, i.e., IP addresses that are accessible to the devices of the customer premise 105 that are part of the LAN 129 facilitated via a router.

As mentioned, typical network probes are very expensive, costing up to thousands of dollars to monitor a single channel, and, thus, millions of dollars to monitor the hundreds of channels at a network distribution point. Consequently, these network probes can be very cost prohibitive, and implementation of such network probes at every network distribution point may not be feasible. Moreover, with respect to media quality issues at occur at the customer premise, service providers are generally at the mercy of their customers to report problems since the implementation of network probes at network distribution points does not provide detection of such customer premise issues. In a typical scenario, a customer may call a call center to report an issue. In response, the call center agent may then try to diagnose the problem. In many circumstances, however, it may be difficult for the agent to determine whether the problem is a distribution issue (e.g., issue associated with the network), a set-top box issue (e.g., hardware and/or software), an issue with wiring inside the customer's home, a customer-use issue, etc. In addition, the agent may need to ask the customer to turn on his set-top box and tune to the "problematic channel." However, because some issues may be temporarily (but reoccurring), those may be even more difficult to resolve. Furthermore, in such scenarios, the agent is simply reacting to a customer complaint, as opposed to proactively addressing problems before those problems are noticed by the subscriber base.

To address these issues, the system 100 of FIG. 1 introduces the capability to monitor a plurality of channels at a customer premise. By way of example, a set-top box apparatus (e.g., of the set-top box 103) may receive a digital signal representing a plurality of channels transported over a media broadcast network. The set-top box apparatus, via the network probe 104, may then determine whether one of the channels satisfies a predetermined criterion relating to performance of the media broadcast network. In one scenario, the set-top box apparatus may include a network monitoring probe having the capabilities of a full-band capture device that effectively minimizes the analog domain to a fast analog-to-digital converter that can digitize the entire frequency band (e.g., 54 MHz to 1000 MHz), enabling non-intrusive access to the entire video spectrum. Thus, signal level, signal-to-noise ratio, modulation error ratio, bit error rate, etc., of all the channels may be measured without negatively affecting the customer's viewing experience. The measurements may then be compared with predefined parametric limits for the digital signal (or the channels of the digital signal) to determine whether any of the channels are outside of the parametric limits.

Based on the determination, the set-top box apparatus may thereafter generate a network feedback signal for transmission to a network monitoring node (e.g., the monitoring platform 101) of the media broadcast network, for instance, to indicate to the network monitoring node the channels that are outside the parametric limits. Additionally, or alternatively, the set-top box apparatus may also send a heartbeat up on a prescribed interval signaling that a subscriber's home is within the defined parametric limits. It is noted that although full-band capture devices have been designed to enable faster channel changes, the implementation of monitoring probes that utilizing the architecture of a full-band capture device opens up many new applications in the area of network monitoring to improve overall customer experience (e.g., through non-intrusive access to the entire video spectrum, proactive feedback relating to the quality of the channels at the customer premise and/or at content distribution nodes of the network, proactive notifications to the customer of issues and resolutions, etc.).

As such, in some embodiments, the set-top box 103, via network probe 104, may analyze a video spectrum associated with a plurality of frequency ranges based on the predetermined criterion, wherein the digital signal includes the video spectrum, and the plurality of channels correspond to the plurality of frequency ranges. In one use case, the network feedback signal may be based on the analysis of the video spectrum. Moreover, in some cases, the transmission of data to the network monitoring node may be limited to mitigate excessive network traffic by offloading collection when it is unnecessary. For example, if signal level is to be collected and measured with respect to dBmV, the signal level indicators and their respective limits may be defined as follows in Table 1 below:

TABLE 1

Signal Level Indicators: Good, Fair, and Unacceptable

<−15 dBmV = Unacceptable
>−15 dBmV and <−12 dBmV = Fair
>−12 dBmV < +12 dBmV = Good
>+12 dBmV < +15 dBmV = Fair
>+15 dBmV = Unacceptable.

A process could be setup to constantly scan the frequency ranges (e.g., based on the specific EIA-QAM frequencies (Electronic Industries Alliance-Quadrature Amplitude Modulation frequencies) frequencies and test to the acceptable range. A "heartbeat" may, for instance, be sent back to a network monitoring node using standard or proprietary protocols to tell the network monitoring node that the network test point was "good", "fair", or "unacceptable." Business intelligence at the data collection center could then make decisions based upon return collection of information as to whether any actions should be taken.

In certain embodiments, network probe 104, may collect and analyze data, for instance, to determine whether the signals received at set-top box 103 for presenting the audio-visual content are within parametric limits. By way of example, network probe 104 may measure signal level, signal-to-noise ratio, modulation error rate, bit error rate, etc., for determining the quality of the audio-visual content presentation along with any issues related to the media broadcast network. In addition, other functions of network probe 104 may include determining the protocols utilized by the network, determining the nodes that receive network feedback signals, identifying distribution points from which content is received, sending alerts and notifications if any issues are detected, etc. It is noted that, in various embodiments, some or all of these functions may be performed by the network probes 104 within the set-top boxes 103 or in conjunction with one or more network probes 104 within service provider network 107.

In various embodiments, the set-top box 103 may present a notification relating to the network feedback signal to a user of the set-top box apparatus. As such, the customer may automatically be informed of issues relating to an affected channel or frequency. In addition, the notification may inform the customer that the issues have already been reported to a network monitoring service and that network operations personnel are currently working to rectify the issues. In this way, even if the issues have not currently been resolved, the customer is relieved of the task of having to call a customer service center to report problems, and is reassured that their issues are being resolved. Thus, the customer experience will be improved.

In other embodiments, the monitoring platform 101 (e.g., the network monitoring node) may determine a signal representing a plurality of channels that is transmitted, over a media broadcast network, to a set-top box apparatus. The monitoring platform 101 may then receive a network feedback signal (with respect to the signal) that is generated based on a determination, at the set-top box, of whether one of the plurality of channels satisfies a predetermined criterion relating to performance of the media broadcast network. As indicated, the predetermined criterion may be based on a parametric limit associated with the signal, and the parametric limit may relate to a signal level, a signal-to-noise ratio, a modulation error ratio, a bit error rate, etc.

In certain embodiments, the monitoring platform 101 may initiate an action to facilitate satisfaction of the predetermined criterion based on the network feedback signal. In additional embodiments, the monitoring platform 101 may determine an impact on a user of the set-top box apparatus based on the network feedback signal, wherein the action is further based on the impact determination. By way of example, the following actions in Table 2 below may be initiated based on the network feedback signal and/or the impact determination:

TABLE 2

Examples of Initiating Actions Based on Network Feedback Signals

1. All heartbeats indicate that signal level is "good" - No action taken
2. Single point - transition from "good" to "fair"
Ask network monitoring node to do additional query (e.g., to confirm that rendering of video is not negatively impacting the customer's viewing experience), and then take additional steps based upon the results.
3. Multiple points - transitions from "good" to "fair"
Ask network monitoring node to do additional query (e.g., to confirm that rendering of video is not negatively impacting the customer's viewing experience), and then take additional steps based upon the results.
Ask network monitoring node to query distribution content nodes (e.g., Super Head Ends (SHEs), Video Hub Offices (VHOs), Video Serving Offices (VSOs), network splitters, etc.) to determine if there is a content distribution issue, and then take additional steps based upon the results (e.g., inform network operations center (NOC)).

In one embodiment, each data collection point (e.g., user devices at the customer premise, content distribution nodes, etc.) may have defined "limits" for each of these parametric values per EIA frequency defined in the radio frequency (RF) plant. A network map may then be generated based on the data collection points and the hierarchy of the distribution of content for the service provider or Managed Service Offering (MSO). In another embodiment, video analysis could be performed. For example, a channel/frequency that is outside of certain parametric limits could be decoded and run through video quality analysis to determine the impact on the end user.

In further embodiments, the monitoring platform 101 may receive another network feedback signal generated based on another determination, at a content distribution node of the media broadcast network, of whether the one of the plurality of channels satisfies the predetermined criterion, wherein the signal is transmitted to the set-top box apparatus via the content distribution node. By way of example, two types of data collection points may be defined: (1) a set-top box/digital video recorder/media server (STB/DVR/Media Server) that is located in the customer home (e.g., that includes a low-cost monitoring probe); and a low-cost "network probe" that could be strategically placed in the distribution network (e.g., defined based on the point of receipt of content (head end)), or any other point of distribution (e.g. VHO, VSO, distribution amplifiers, network splitters, etc.), depending on the desired level of granularity.

Figure 2A:
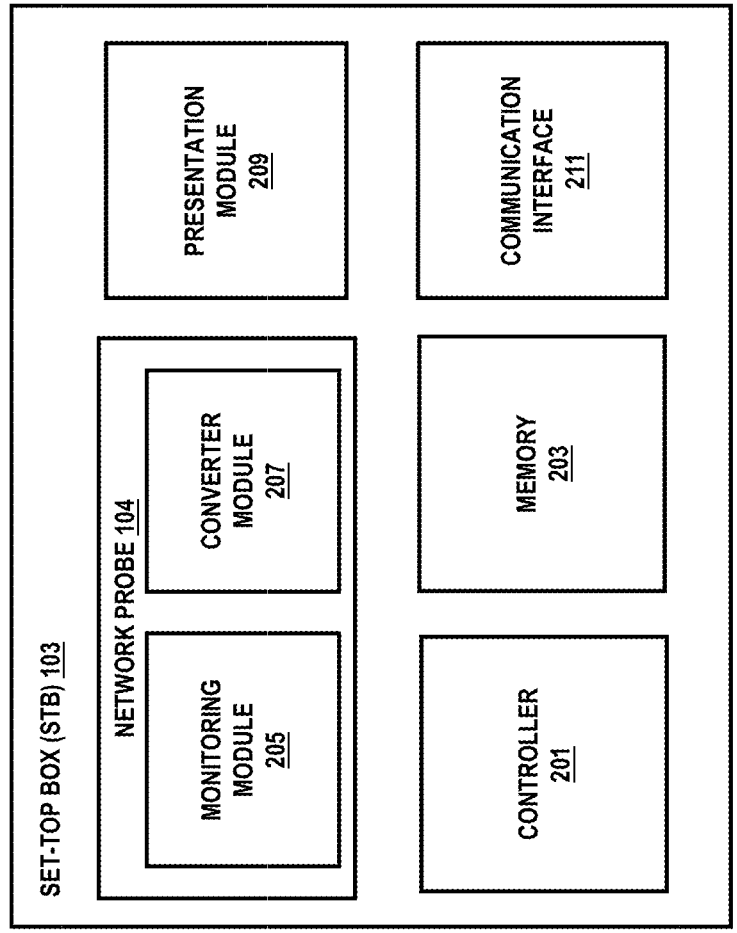
FIG. 2A is a diagram of the components of a set-top box at a customer premise, according to an embodiment.

FIG. 2A is a diagram of the components of a set-top box at a customer premise, according to an embodiment. The set-top box 103 may comprise computing hardware (such as described with respect to FIG. 8), as well as include one or more components configured to execute the processes of the system 100 described herein. It is contemplated that the functions of these components may be combined in one or more components or performed by other components of equivalent functionality. In one implementation, the set-top box 103 includes a controller 201, memory 203, the network probe 104 having a monitoring module 205 and a converter module 207, a presentation module 209, and a communication interface 211.

By way of example, the controller 201 may direct the communication interface 211 to receive a digital signal representing a plurality of channels transported over a media broadcast network. The channels may then be monitored by the monitoring module 205, which may determine whether one of the channels satisfies a predetermined criterion relating to performance of the media broadcast network (e.g., whether the channel being watched by the customer satisfies predetermined parametric limits, whether other channels satisfy the parametric limits, etc.). In one scenario, the channels may be received in an analog form. The converter module 207 may, for instance, digitize the entire band (e.g., from 54 MHz to 1000 MHz) to enable non-intrusive access to the entire video spectrum so that parametric values, such as signal level, signal-to-noise ratio, modulation error rate, bit error rate, etc., can be measured without the customer's viewing experience being affected. As such, the monitoring module 205 may analyze the video spectrum associated with the frequency ranges based on the predetermined criterion to determine whether one or more of the channels satisfy the predetermined criterion.

Based on the determination of whether one or more of the channels satisfy the predetermined criterion, the monitoring module 205 may then generate a network feedback signal for transmission to a network monitoring node of the media broadcast network. The network feedback signal may, for instance, inform the network monitoring node if any of the plurality of channels were outside of predefined parametric limits. Additionally, or alternatively, the network feedback signal may inform the network monitoring node that the channels are within the predefined parametric limits (e.g., the network feedback signal may be transmitted as a "heartbeat" on a prescribed, periodic basis).

In addition, the presentation module 209 may present a notification relating to the network feedback signal to the customer (e.g., the user of the set-top box 103). As discussed, the customer may automatically be informed of issues relating to an affected channel or frequency. In addition, the notification may inform the customer that the issues have already been reported to a network monitoring service and that network operations personnel are currently working to rectify the issues. In this way, even if the issues have not currently been resolved, the customer is relieved of the task of having to call a customer service center to report problems, and is reassured that their issues are being resolved. Thus, the customer experience will be improved.

As indicated, the communication interface 211 may be utilized to communicate between components of the set-top box 103 and the system 100 (e.g., receiving signals representing the plurality of channels, transmitting network feedback signals, etc.). The communication interface 211 may include multiple means of communication. For example, the communication interface 211 may be able to communicate with the network monitoring node over Simple Network Management Protocol (SNMP), Technical Report 069 (TR-069), or other types of communication means.

Figure 2B:
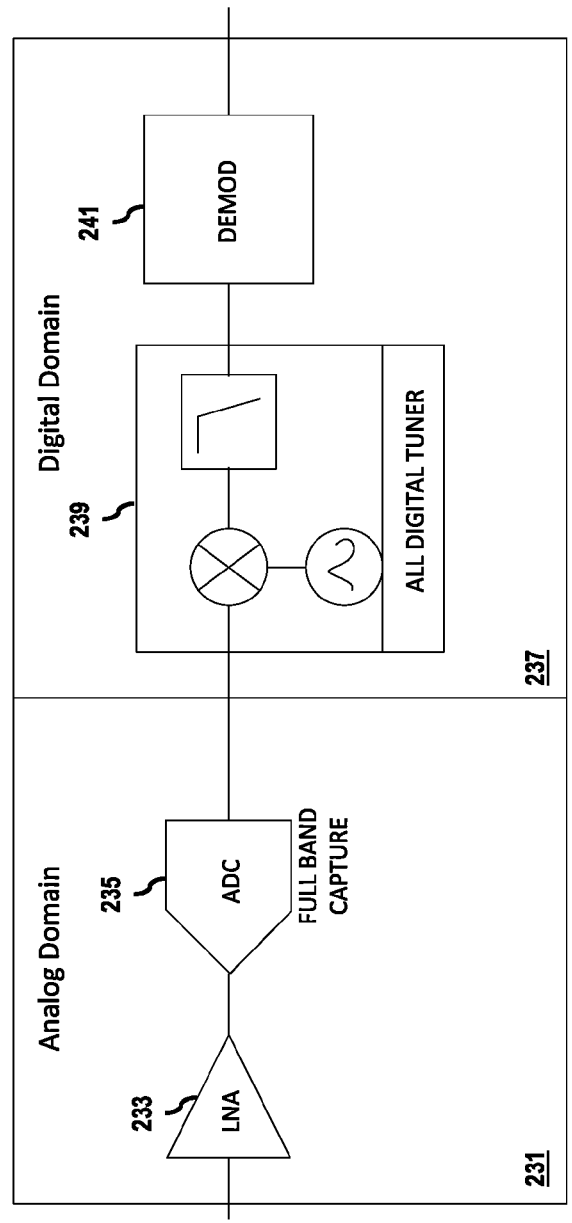
FIGS. 2B and 2C are diagrams of the components of a monitoring probe, according to various exemplary embodiments.
Figure 2C:
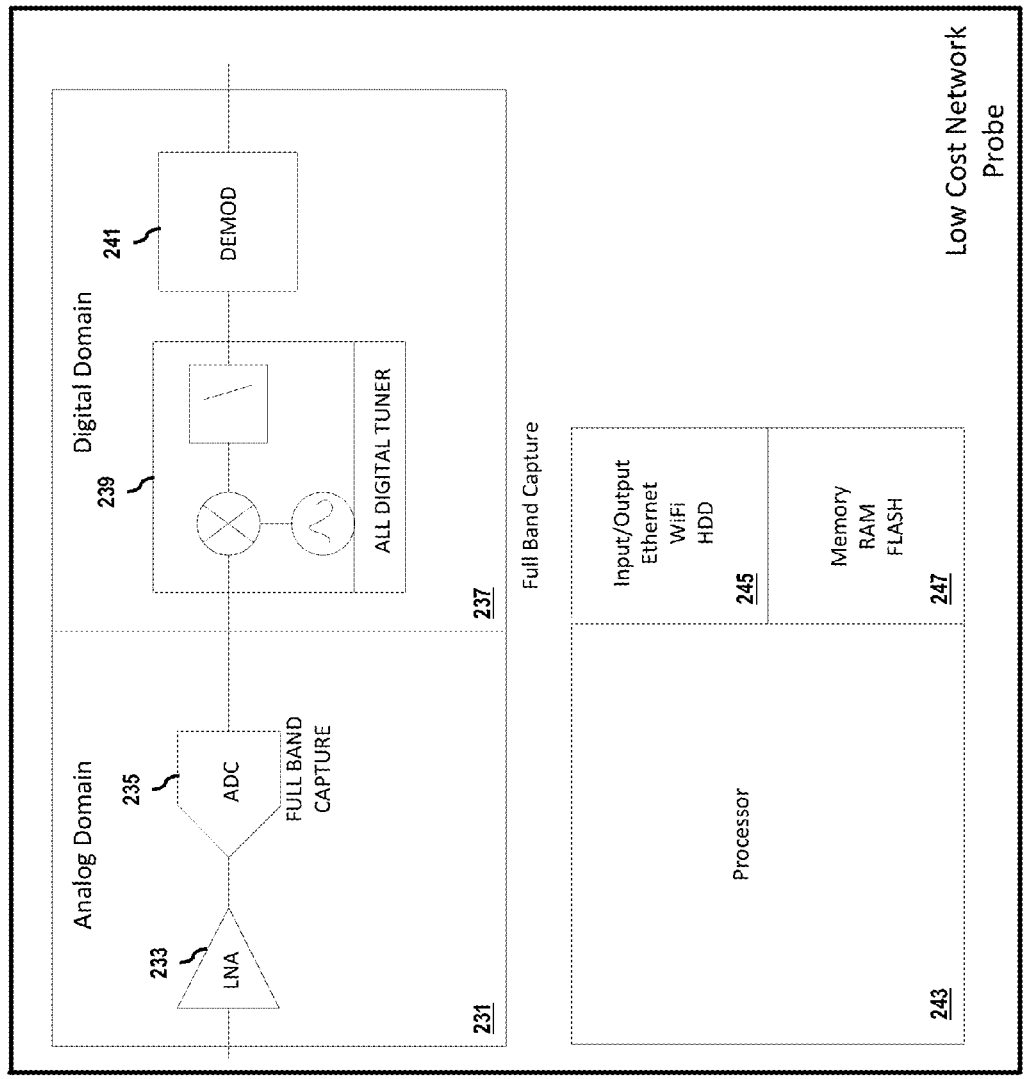

FIGS. 2B and 2C are diagrams of the components of a monitoring probe, according to various exemplary embodiments. As shown, FIG. 2B illustrates an example full-band digital tuner architecture that may be implemented in a network monitoring probe. The full-band digital tuner architecture improves upon the traditional tuner architecture (e.g., a legacy analog tuner architecture) that includes an analog domain having a low noise amplifier coupled to an analog tuner to tune to a specific channel, and an analog-to-digital converter to transform the tuned channel to a digital form. In contrast, the example full-band digital tuner architecture includes an analog domain 231 having a low noise amplifier 233 that is configured to receive a signal representing multiple channels in an analog form, and a fast analog-to-digital converter 235 that is configured to capture and digitize the entire frequency band of the signal.

Thus, a network monitoring probe that implements such a full-band digital tuner architecture may enable non-intrusive access to the entire video spectrum, allowing various parametric values (e.g., signal level, signal-to-noise ratio, modulation error rate, bit error rate, etc.) to be measured without negatively affecting the customer's viewing experience. Moreover, the digital tuner architecture may include a digital domain 237 having a digital tuner 239 that is configured to tune to one of the channels, and a demodulator 241 that is configured to demodulate the channels. As noted, full-band capture devices have been designed to enable faster channel changes. Nonetheless, the implementation of network monitoring probes utilizing the architecture of a full-band capture device opens up many new applications in the area of network monitoring to improve overall customer experience (e.g., through non-intrusive access to the entire video spectrum, proactive feedback relating to the quality of the channels at the customer premise and/or at content distribution nodes of the network, proactive notifications to the customer of issues and resolutions, etc.).

FIG. 2C illustrates an example network monitoring probe utilizing the digital tuner architecture. As shown, the network monitoring probe may include a processor 243, input/output components 245, and memories 247 along with the components of the digital tuner architecture. As mentioned, the monitoring probe may function as a full-band probe device in the subscriber's home, allowing for remote network monitoring. The monitoring probe may, for instance, enable setting of parametric limits in the entire video band that could signal a remote monitoring server if any of the channels were outside of the predefined parametric limits. In addition, the monitoring probe may send a heartbeat up on a prescribed, periodic basis to signal that a subscriber's home is within the predefined parametric limits. Communication to the remote monitoring equipment may, for instance, be preformed over SNMP, TR-069, or any other remote communication protocol.

Figure 3:
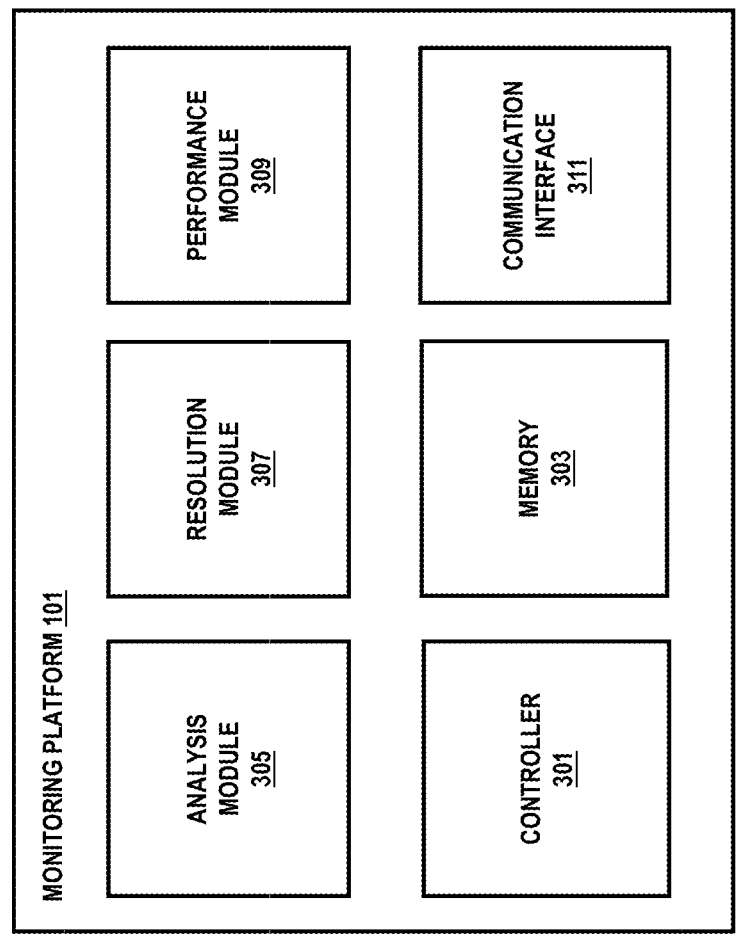
FIG. 3 is a diagram of the components of a monitoring platform, according to an embodiment.

FIG. 3 is a diagram of the components of a monitoring platform, according to an embodiment. The monitoring platform 101 may comprise computing hardware (such as described with respect to FIG. 8), as well as include one or more components configured to execute the processes of the system 100 described herein. It is contemplated that the functions of these components may be combined in one or more components or performed by other components of equivalent functionality. In one implementation, the monitoring platform 101 includes a controller 301, memory 303, an analysis module 305, a resolution module 307, a performance module 309, and a communication interface 311.

By way of example, the controller 301 may work with the analysis module 305 to determine a signal representing a plurality of channels that is transmitted, over a media broadcast network, to a set-top box. The controller 301 may also utilize the communication interface 311 to receive a network feedback signal that is generated based on a determination, at the set-top box, of whether one of the plurality of channels satisfies a predetermined criterion relating to performance of the media broadcast network. In some embodiments, the controller 301 may also utilize the communication interface 311 to receive another network feedback signal generated based on another determination, at a content distribution node of the media broadcast network, of whether the one of the plurality of channels satisfies the predetermined criterion, wherein the signal is transmitted to the set-top box via the content distribution node (e.g., SHE, VHO, VSO, a network splitter, etc.).

The analysis module 305 may thus analyze the network feedback signal from the set-top box and/or the other network feedback signal from the content distribution node to determine an impact on a user of the set-top box. If, for instance, it is determined that the user of the set-top box will be negatively impacted (e.g., by affected channels), the resolution module 307 may then determine an action to facilitate satisfaction of the predetermined criterion based on the network feedback signal and/or the other network feedback signal.

In certain embodiments, the controller 301 may additionally interact with the performance module 309 to determine parametric limits for the channels at the set-top box and/or at the content distribution node. As discussed, these parametric limits may relate to a signal level, a signal-to-noise ratio, a modulation error ratio, a bit error rate, etc. Channels at the set-top box and/or at the content distribution node that fall outside these parametric limits may, for instance, be reported to the monitoring platform 101 via network feedback signals. Consequently, the monitoring platform 101 may initiate (e.g., through the resolution module 307) an action to rectify the affected channels.

As mentioned, the communication interface 311 may be utilized to communicate between components of the monitoring platform 101 and the system 100 (e.g., receiving network feedback signals). In addition, the communication interface 311 may include multiple means of communication. For example, the communication interface 311 may be able to communicate with the set-top box, the content distribution node, etc., over SNMP, TR-069, or other types of communication means.

Figure 4:
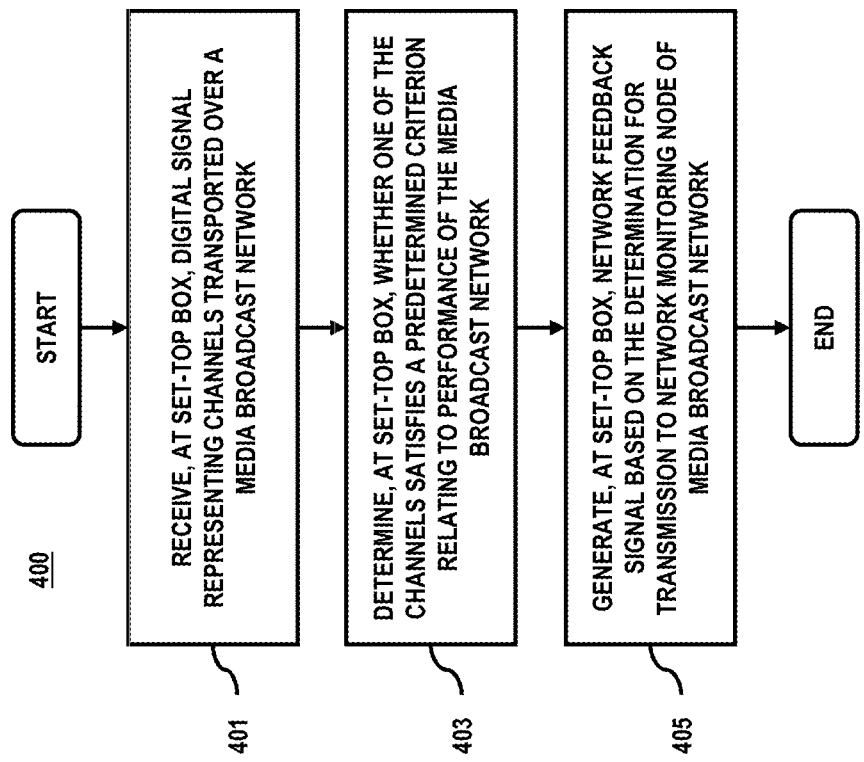
FIG. 4 is a flowchart of a process for providing feedback based on monitoring of channels at a customer premise, according to an embodiment.

FIG. 4 is a flowchart of a process for providing feedback based on monitoring of channels at a customer premise, according to an embodiment. For the purpose of illustration, process 400 is described with respect to FIG. 1. It is noted that the steps of the process 400 may be performed in any suitable order, as well as combined or separated in any suitable manner. In step 401, the set-top box 103 may receive a digital signal representing a plurality of channels transported over a media broadcast network. By way of example, the plurality of channels may initially be transported over the media broadcast network to the set-top box 103 in an analog form. As indicated, the set-top box 103 may include a network monitoring probe having the capabilities of a full-band capture device that digitizes the entire frequency band associated with the plurality of channels to enable non-intrusive access to the entire video spectrum.

The set-top box 103 may then, at step 403, determine (e.g., via the network probe 104) whether one of the plurality of channels satisfies a predetermined criterion relating to performance of the media broadcast network. For example, the predetermined criterion may be based on a parametric limit relating to a signal level, a signal-to-noise ration, a modulation error ratio, a bit error rate, etc. In one use case, signal level, signal-to-noise ratio, modulation error ratio, bit error rate, etc., may be measured and then compared with predefined parametric limits for the digital signal (or the channels of the digital signal) to determine whether any of the channels are outside of the parametric limits.

Thereafter, in step 405, the set-top box 103 may generate a network feedback signal based on the determination for transmission to a network monitoring node of the media broadcast network. As a result, in certain embodiments, an action may be initiated by a network monitoring service associated with the network monitoring node to facilitate satisfaction of the predetermined criterion based on the network feedback signal. As indicated, in various embodiments, the network monitoring node may be the monitoring platform 101. By way of example, the monitoring platform 101 may transmit instructions to the network monitoring service to initiate the actions to facilitate the satisfaction of the predetermined criterion.

Figure 5:
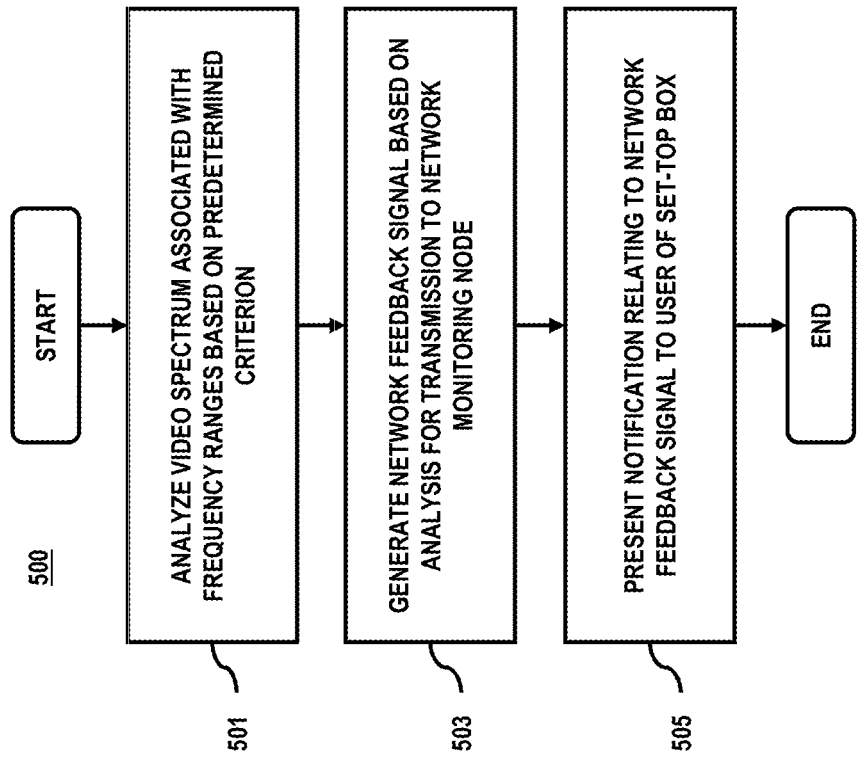
FIG. 5 is a flowchart of a process for providing notifications based on an analysis of a video spectrum at a customer premise, according to an embodiment.

FIG. 5 is a flowchart of a process for providing notifications based on an analysis of a video spectrum at a customer premise, according to an embodiment. For the purpose of illustration, process 500 is described with respect to FIG. 1. It is noted that the steps of the process 500 may be performed in any suitable order, as well as combined or separated in any suitable manner. In step 501, the set-top box 103 may analyze (e.g., via the network probe 104) a video spectrum associated with a plurality of frequency ranges based on the predetermined criterion, wherein the digital signal includes the video spectrum, and the plurality of channels corresponding to the plurality of frequency ranges.

As discussed, the network feedback signal may be based on the analysis. Thus, in step 503, the set-top box 103 may generate the network feedback signal based on the analysis for transmission to the network monitoring node. By way of example, an analysis of the video spectrum may identify whether the signal level associated with certain channels and/or frequency ranges are "good," "fair," or "unacceptable" (e.g., according to the guidelines in Table 1). As such, the generated network feedback signal may be include these signal level indicators for the particular channels and/or frequency ranges.

In addition, in step 505, the set-top box 103 may present a notification relating to the network feedback signal to a user of the set-top box. In one scenario, for instance, the notification may assure the user that network operations personnel are currently working to rectify issues with particular channels, provide the user with an estimation of when the issues will be resolved, or present other assurances to the user. Thus, monitoring at the customer premise may improve the customer experience through these proactive notifications and resolutions.

Figure 6:
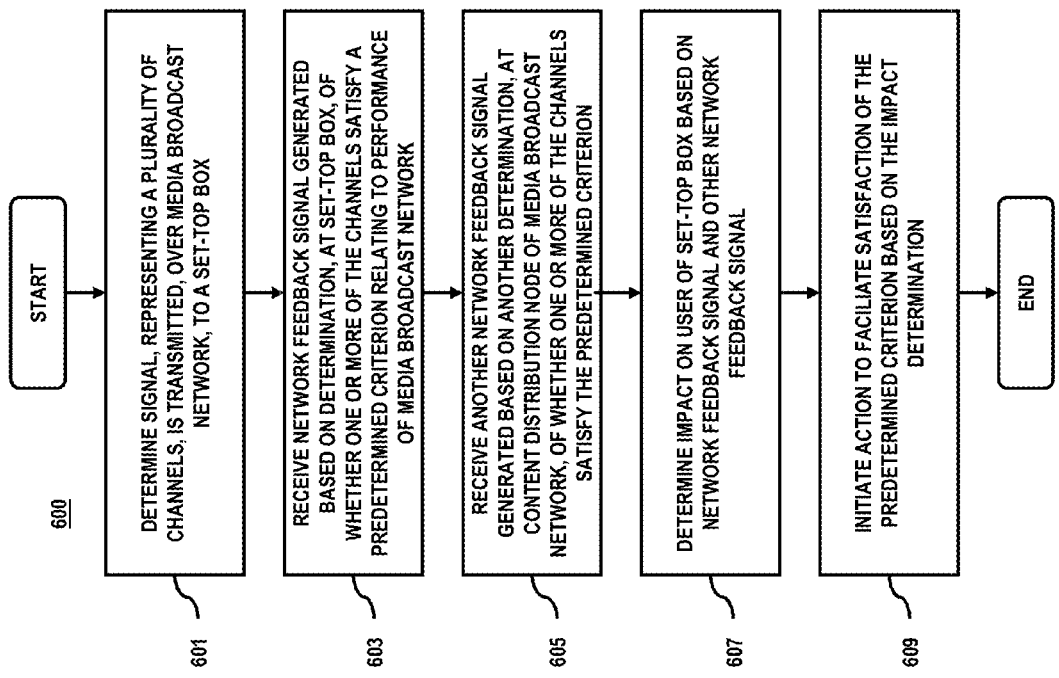
FIG. 6 is a flowchart of a process for initiating actions to facilitate satisfaction of a predetermined performance criterion, according to an embodiment.

FIG. 6 is a flowchart of a process for initiating actions to facilitate satisfaction of a predetermined performance criterion, according to an embodiment. For the purpose of illustration, process 600 is described with respect to FIG. 1. It is noted that the steps of the process 600 may be performed in any suitable order, as well as combined or separated in any suitable manner. In step 601, the monitoring platform 101 may determine a signal representing a plurality of channels that is transmitted, over a media broadcast network, to a set-top box. In step 603, the monitoring platform 101 may receive a network feedback signal (with respect to the signal) that is generated based on a determination, at the set-top box, of whether one or more of the channels satisfy a predetermined criterion relating to performance of the media broadcast network.

Moreover, in step 605, the monitoring platform 101 may receive another network feedback signal generated based on another determination, at a content distribution node of the media broadcast network, of whether the one or more of the channels satisfy the predetermined criterion; the signal is transmitted to the set-top box via the content distribution node. By way of example, low-cost network monitoring probes (e.g., utilizing the full-band digital tuner architecture) may be implemented in a set-top box at the customer premise as well as content distribution nodes (e.g., SHE, VHO, VSO, a network splitter, etc.) of the media broadcast network depending on the desired level of granularity.

In step 607, the monitoring platform 101 may determine an impact on a user of the set-top box based on the network feedback signal and the other network feedback signal. The monitoring platform 101 may then, at step 609, initiate an action to facilitate satisfaction of the predetermined criterion based on the impact determination. For example, the monitoring platform 101 may determine the user impact and initiate the action according to the guidelines of Table 2.

Figure 7:
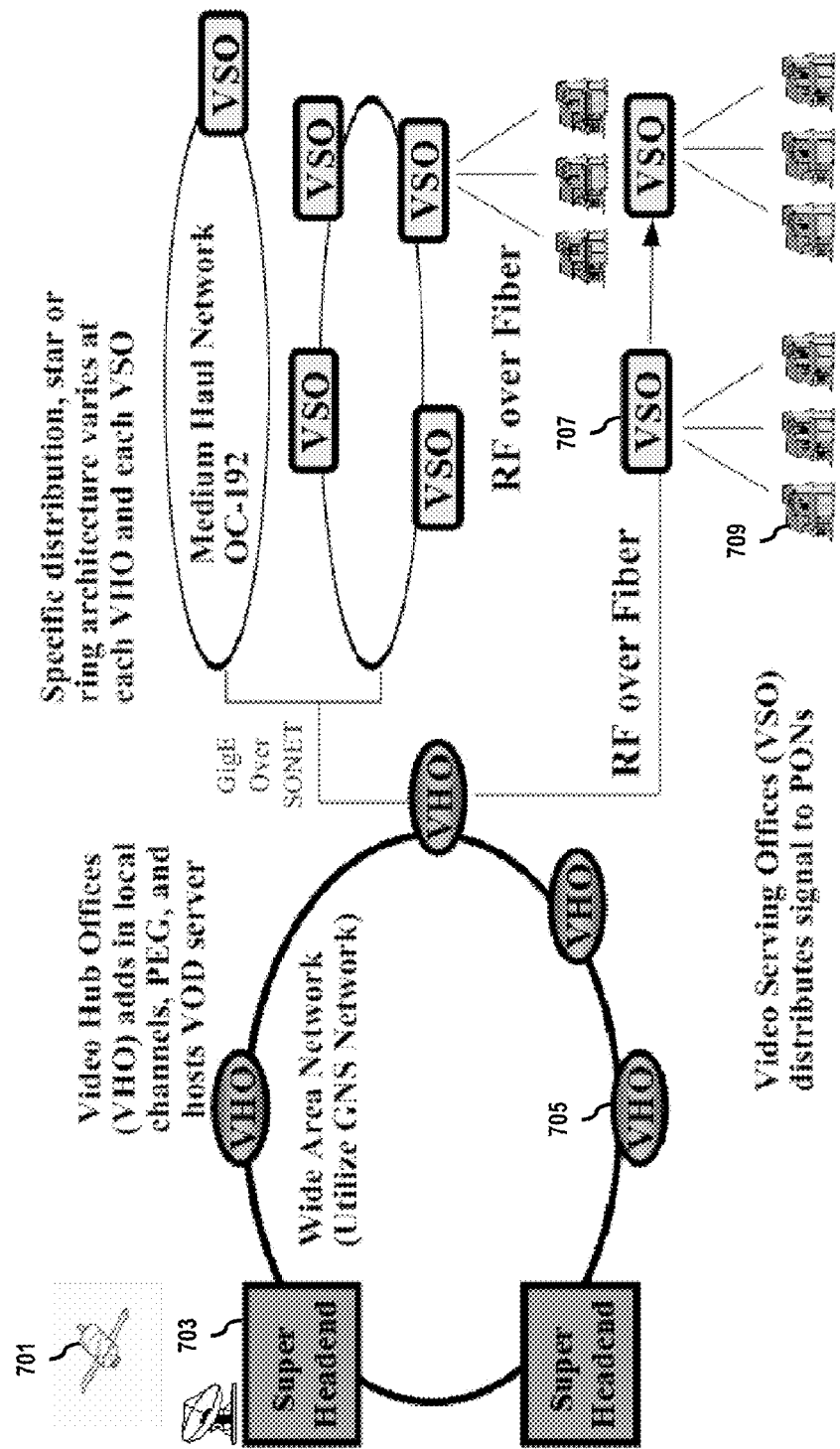
FIG. 7 is a diagram of an architecture of a video service, according to an embodiment.

FIG. 7 is a diagram of an architecture of a video service, according to an embodiment. As shown, the high-level video architecture includes satellites 701, SHEs 703, VHOs 705, VSOs 707, and customer premises 709 within various networks. A signal representing one or more channels may be degraded at any of these various points. For example, a signal may be degraded upon reception at an SHE, upon distribution from an SHE to a VHO, upon distribution from a VHO to a VSO, when lost or disrupted in a network splitter, or when negatively impacted by other factors at the customer premise.

Since the low-cost network monitoring probe (e.g., utilizing the full-band digital tuner architecture) may be implemented as a stand-alone "network probe," it may be attached at any point in the network to query network health and check the network health against a set of predefined parametric limits. Good health may, for instance be communicated with a simple heartbeat, and bad health may be communicated with full parametric details. In this way, the low-cost network monitoring probes allow the network from the SHE to the VHO to the VSO to the subscriber home to be mapped out at a fraction of the cost that current technology affords, and enable a proactive notification system for network operations as well as the subscriber base. By way of example, a set-top box at the customer premise may send a notification to the network management server that there is a channel that is outside of parametric limits. The network management server may then query its database and determine if the event was based in the home, the network serving the home, the VSO, the VHO, or the SHE. Moreover, active notifications may automatically inform the subscriber if they tuned to an affected channel and/or frequency. Additional notification may be delivered to both call center personnel and network operations personnel so that the issue can be rectified, mitigating any negative impact to the subscriber base.

In one scenario, another service provider may launch a new cell tower that causes various set-top boxes (e.g., that include full-band capture devices) at the customer premises within a 10 block radius of the cell tower to detect bit error rates in the affected QAM frequencies. This information may then be fed back to the network monitoring nodes (e.g., at the network operation center) associated with the affected customer premises, which may in turn cause the output of the affected frequencies to be raised until the affected customer premises no longer exhibit bit errors that negatively impacts the ability to watch the affected channel. Thus, at the point of the incident, the network operation center would be able to actively monitor the affected frequencies and play an active role in grooming the network to ensure the best subscriber experience.

The processes described herein for providing feedback based on monitoring of channels at a customer premise may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
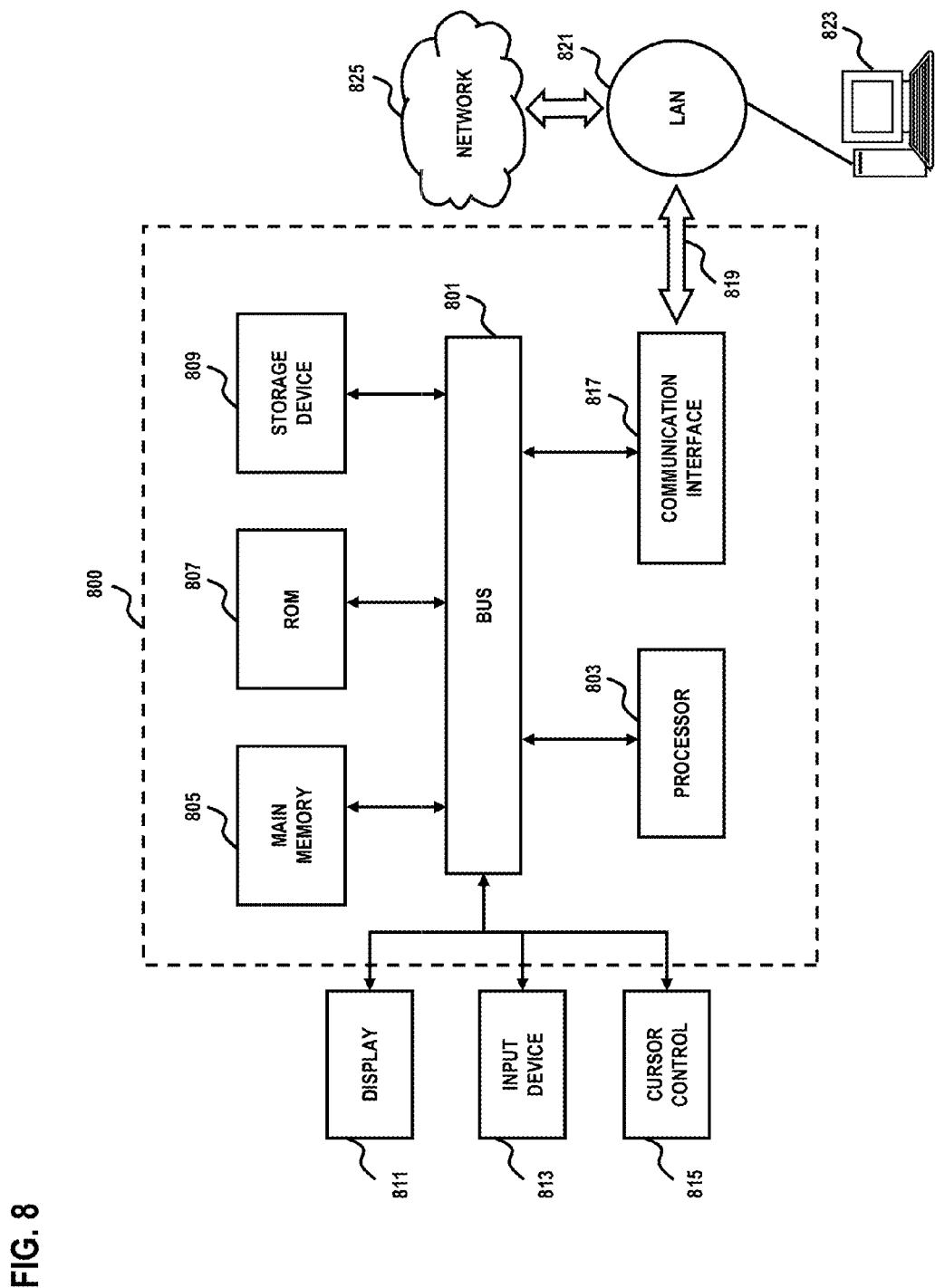
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
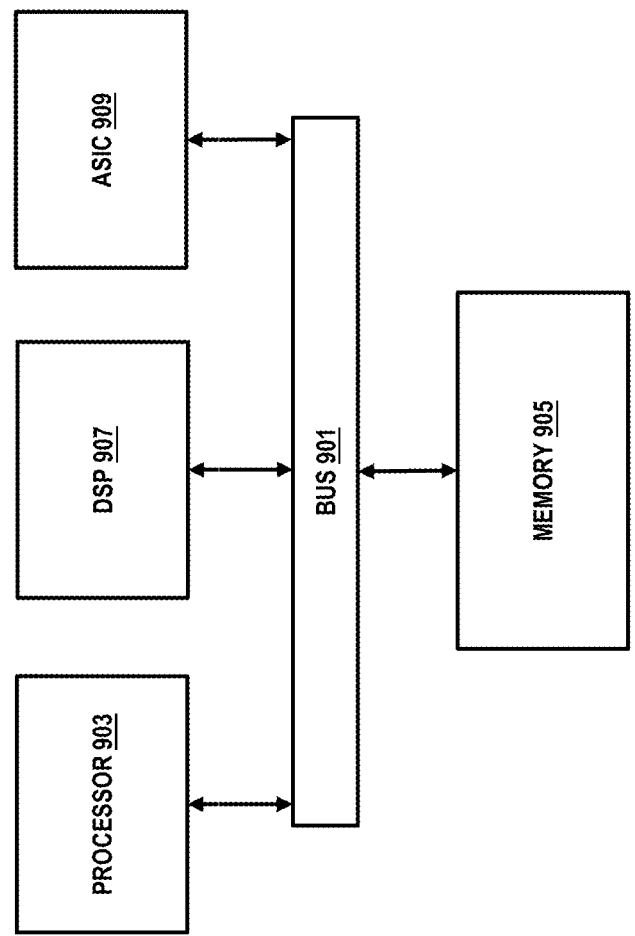
FIG. 9 is a diagram of a chip set that can be used to implement an embodiment of the invention.

FIG. 9 illustrates a chip set or chip 900 upon which an embodiment of the invention may be implemented. Chip set 900 is programmed to enable feedback based on monitoring of channels at a customer premise as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling feedback based on monitoring of channels at a customer premise.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable feedback based on monitoring of channels at a customer premise. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving, at a set-top box apparatus, a digital signal representing a plurality of channels transported over a media broadcast network;
monitoring all of the plurality of channels and determining at the set-top box apparatus whether one or more of the plurality of channels satisfies a predetermined criterion relating to performance of the media broadcast network; and
generating, at the set-top box apparatus, a network feedback signal based on the determination for transmission to a network monitoring node of the media broadcast network,
wherein the received digital signal includes a video spectrum associated with a plurality of frequency ranges from 54 MHz to 1000 MHz, which encompasses an entirety of the video spectrum,
wherein the plurality of channels correspond to the plurality of frequency ranges,
wherein monitoring all the plurality of channels includes analyzing the entire video spectrum associated with the plurality of frequency ranges based on the predetermined criterion, and
wherein monitoring all the plurality of channels further includes determining whether the channel being watched by a customer as well as other channels of the plurality of channels of the received digital signal satisfies the predetermined criterion.

2. A method according to claim 1, further comprising:
analyzing a video spectrum associated with a plurality of frequency ranges based on the predetermined criterion, wherein the digital signal includes the video spectrum, and the plurality of channels correspond to the plurality of frequency ranges.

3. A method according to claim 1, further comprising:
presenting a notification relating to the network feedback signal to a user of the set-top box apparatus,
wherein the notification informs the customer that issues have already been reported to a network monitoring service and that network operations personnel are currently working to rectify the issues.

4. A method according to claim 1, wherein the predetermined criterion is based on a parametric limit associated with the digital signal, and the parametric limit relates to a signal level, a signal-to-noise ratio, a modulation error ratio, a bit error rate, or a combination thereof.

5. A method according to claim 1, wherein an action is initiated by a networking monitoring service associated with the network monitoring node to facilitate satisfaction of the predetermined criterion based on the network feedback signal.

6. An apparatus comprising:
at least one processor; and
at least one memory including computer program code for one or more programs,
the at least one memory and the computer program code configured to, with the at least one processor, cause the apparatus to perform at least the following,
receive, at a set-top box apparatus, a digital signal representing a plurality of channels transported over a media broadcast network;
monitor all of the plurality of channels and determine at the set-top box apparatus whether one or more of the plurality of channels satisfies a predetermined criterion relating to performance of the media broadcast network; and
generate, at the set-top box apparatus, a network feedback signal based on the determination for transmission to a network monitoring node of the media broadcast network,
wherein the received digital signal includes a video spectrum associated with a plurality of frequency ranges from 54 MHz to 1000 MHz, which encompasses an entirety of the video spectrum,
wherein the plurality of channels correspond to the plurality of frequency ranges,
wherein monitoring all the plurality of channels includes analyzing the entire video spectrum associated with the plurality of frequency ranges based on the predetermined criterion, and
wherein monitoring all the plurality of channels further includes determining whether the channel being watched by a customer as well as other channels of the plurality of channels of the received digital signal satisfies the predetermined criterion.

7. An apparatus according to claim 6, wherein the apparatus is further caused to:
analyze a video spectrum associated with a plurality of frequency ranges based on the predetermined criterion, wherein the digital signal includes the video spectrum, and the plurality of channels correspond to the plurality of frequency ranges.

8. An apparatus according to claim 6, wherein the apparatus is further caused to:
present a notification relating to the network feedback signal to a user of the set-top box apparatus,
wherein the notification informs the customer that issues have already been reported to a network monitoring service and that network operations personnel are currently working to rectify the issues.

9. An apparatus according to claim 6, wherein the predetermined criterion is based on a parametric limit associated with the digital signal, and the parametric limit relates to a signal level, a signal-to-noise ratio, a modulation error ratio, a bit error rate, or a combination thereof.

10. An apparatus according to claim 6, wherein an action is initiated by a networking monitoring service associated with the network monitoring node to facilitate satisfaction of the predetermined criterion based on the network feedback signal.

11. A method comprising:
determining a signal representing a plurality of channels that is transmitted, over a media broadcast network, to a set-top box apparatus; and
receiving a network feedback signal generated based on a monitoring all of the plurality of channels and determination at the set-top box apparatus of whether one or more of the plurality of channels satisfies a predetermined criterion relating to performance of the media broadcast network,
wherein the signal transmitted to the set-top box includes a video spectrum associated with a plurality of frequency ranges from 54 MHz to 1000 MHz, which encompasses an entirety of the video spectrum, wherein the plurality of channels correspond to the plurality of frequency ranges, wherein monitoring all the plurality of channels includes analyzing the entire video spectrum associated with the plurality of frequency ranges based on the predetermined criterion, and wherein monitoring all the plurality of channels further includes determining whether the channel being watched by a customer as well as other channels of the plurality of channels of the received digital signal satisfies the predetermined criterion.

12. A method according to claim 11, further comprising:
initiating an action to facilitate satisfaction of the predetermined criterion based on the network feedback signal.

13. A method according to claim 12, further comprising:
determining an impact on a user of the set-top box apparatus based on the network feedback signal, wherein the action is further based on the impact determination.

14. A method according to claim 11, further comprising:
receiving another network feedback signal generated based on another determination, at a content distribution node of the media broadcast network, of whether the one of the plurality of channels satisfies the predetermined criterion, wherein the signal representing a plurality of channels is transmitted to the set-top box apparatus via the content distribution node.

15. A method according to claim 11, wherein the predetermined criterion is based on a parametric limit associated with the signal, and the parametric limit relates to a signal level, a signal-to-noise ratio, a modulation error ratio, a bit error rate, or a combination thereof.

16. An apparatus comprising:
at least one processor; and
at least one memory including computer program code for one or more programs,
the at least one memory and the computer program code configured to, with the at least one processor, cause the apparatus to perform at least the following,
determine a signal representing a plurality of channels that is transmitted, over a media broadcast network, to a set-top box apparatus; and
receive a network feedback signal generated based on monitoring all the plurality of channels and a determination at the set-top box apparatus of whether one or more of the plurality of channels satisfies a predetermined criterion relating to performance of the media broadcast network, wherein the signal transmitted to the set-top box includes a video spectrum associated with a plurality of frequency ranges from 54 MHz to 1000 MHz, which encompasses an entirety of the video spectrum, wherein the plurality of channels correspond to the plurality of frequency ranges, wherein monitoring all the plurality of channels includes analyzing the entire video spectrum associated with the plurality of frequency ranges based on the predetermined criterion, and wherein monitoring all the plurality of channels further includes determining whether the channel being watched by a customer as well as other channels of the plurality of channels of the received digital signal satisfies the predetermined criterion.

17. An apparatus according to claim 16, wherein the apparatus is further caused to:
initiate an action to facilitate satisfaction of the predetermined criterion based on the network feedback signal.

18. An apparatus according to claim 17, wherein the apparatus is further caused to:
determine an impact on a user of the set-top box apparatus based on the network feedback signal, wherein the action is further based on the impact determination.

19. An apparatus according to claim 17, wherein the apparatus is further caused to:
receive another network feedback signal generated based on another determination, at a content distribution node of the media broadcast network, of whether the one of the plurality of channels satisfies the predetermined criterion, wherein the signal representing a plurality of channels is transmitted to the set-top box apparatus via the content distribution node.

20. An apparatus according to claim 17, wherein the predetermined criterion is based on a parametric limit associated with the signal, and the parametric limit relates to a signal level, a signal-to-noise ratio, a modulation error ratio, a bit error rate, or a combination thereof.

* * * * *